US009824455B1

(12) United States Patent
Singh et al.

(10) Patent No.: US 9,824,455 B1
(45) Date of Patent: Nov. 21, 2017

(54) DETECTING FOREGROUND REGIONS IN VIDEO FRAMES

(71) Applicant: Amazon Technologies, Inc., Seattle, WA (US)

(72) Inventors: Abhishek Singh, Mountain View, CA (US); Rohith Mysore Vijaya Kumar, Sunnyvale, CA (US); Ambrish Tyagi, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 140 days.

(21) Appl. No.: 14/976,555

(22) Filed: Dec. 21, 2015

(51) Int. Cl.
*G06T 7/00* (2017.01)
*G06T 7/20* (2017.01)

(52) U.S. Cl.
CPC ........ *G06T 7/0081* (2013.01); *G06T 7/0097* (2013.01); *G06T 7/204* (2013.01); *G06T 2207/10016* (2013.01); *G06T 2207/20144* (2013.01); *G06T 2207/20164* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 6,738,424 B1* | 5/2004 | Allmen | ............... | G06T 9/001 375/240.08 |
| 8,050,454 B2* | 11/2011 | Yi | ............... | G06F 17/3079 382/100 |
| 8,358,834 B2* | 1/2013 | Cobb | ............... | G06K 9/00771 382/155 |
| 9,213,901 B2* | 12/2015 | Bernal | ............... | G06K 9/00771 |
| 2008/0159590 A1* | 7/2008 | Yi | ............... | G06F 17/3079 382/103 |
| 2011/0044537 A1* | 2/2011 | Cobb | ............... | G06K 9/00771 382/165 |
| 2013/0136353 A1* | 5/2013 | Cobb | ............... | G06K 9/00771 382/165 |
| 2015/0063628 A1* | 3/2015 | Bernal | ............... | G06K 9/00771 382/103 |

OTHER PUBLICATIONS

Sheikh, "Background Subtraction for Freely Moving Cameras," IEEE 12th International Conference on Computer Vision (ICCV), pp. 1219-1225, (2009).

* cited by examiner

*Primary Examiner* — Nancy Bitar
(74) *Attorney, Agent, or Firm* — K&L Gates LLP

(57) ABSTRACT

Various examples are directed to systems and methods for determining foreground regions in video frames. A computing device may select from a first frame of a video, a plurality of scene point locations and divide the first frame into a plurality of sections. For a first section of the first frame, the computing device may generate a first vector subspace, basis vectors of the first vector subspace are trajectories of scene point locations in the first section. The computing device may determine that a projection error for a first scene point location in the first section is greater than a projection error threshold and write an indication of the first pixel value to a listing of foreground pixel values.

20 Claims, 12 Drawing Sheets

DETECTING FOREGROUND REGIONS IN VIDEO FRAMES

BACKGROUND

In image or video processing, it is often useful to distinguish between portions of a frame representing foreground objects and portions of a frame representing background objects. Detecting foreground objects, however, can be challenging, especially for frames captured with a moving camera.

DETAILED DESCRIPTION

Figure 1:
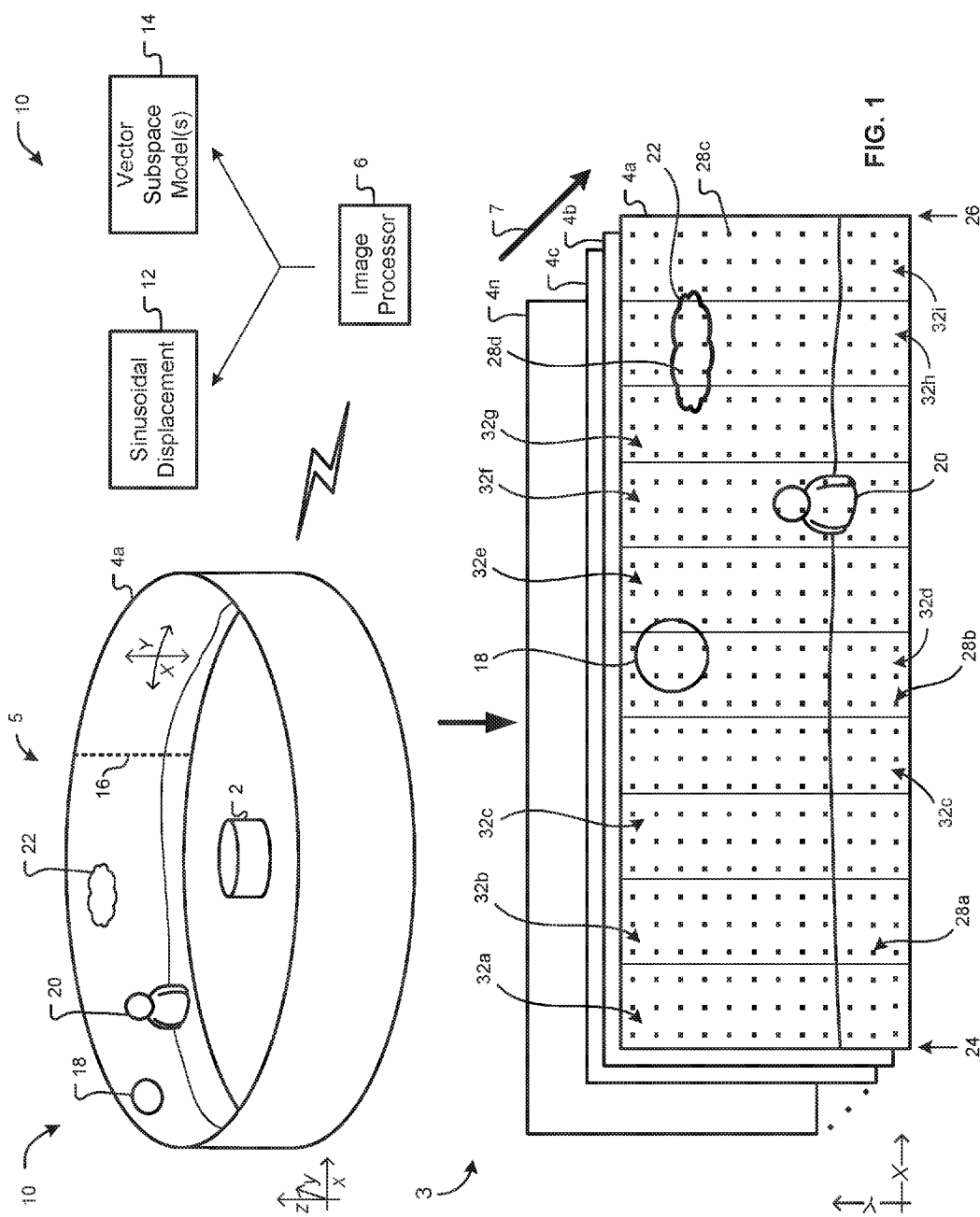
FIG. 1 is a diagram showing one example of an environment for detecting foreground regions in a frame.

In the following description, reference is made to the accompanying drawings, which illustrate several examples of the present disclosure. It is understood that other examples may be utilized and various operational changes may be made without departing from the spirit and scope of the present disclosure. The following detailed description is not to be taken in a limiting sense, and the scope of the embodiments of the present disclosure is defined only by the claims of the issued patent.

Various examples are directed to systems and methods for detecting foreground regions in image or video frames. An image or video frame, sometimes referred to herein as a frame, is a collection of pixel values arranged on a two-dimensional grid. Frames may be captured and/or viewed alone (e.g., image frames) or as part of a video. A video may comprise a set of frames arranged according to a video frame sequence. The video frame sequence describes an order in which the frames were captured, which may also be an order in which the frames may be played-back to view the video.

In some examples, the pixel values making up a frame are captured by a grid of hardware elements, often called pixels. Pixels may be part of a charge coupled device (CCD) or other suitable image sensor in a camera. The image sensor (and/or camera) may include optical components that focus light incident from a scene onto the pixel grid. Each pixel value may be derived from the response of a pixel to the incident light. The spatial arrangement of pixel values on the two-dimensional grid may correspond to the spatial arrangement of the hardware pixels on the image sensor or sensors. In some examples, each pixel value in a frame is directly traceable to the output of a particular hardware pixel. In other examples, however, a frame may be subjected to image processing operations that break the one-to-one correlation between pixels and pixel values. A non-exhaustive list of example image processing operations includes, stitching one or more frames to form a panoramic frame, various filtering, modifications to frame resolution, etc. After image processing operations of this type are applied to a frame, the frame may comprise a plurality of pixel values and a spatial arrangement of the pixel values on the two-dimensional grid, although some or all of the pixel values may not be directly traceable to a particular hardware pixel.

The pixel values making up a frame and the spatial arrangement of the pixel values depicts the scene around the camera that captured the frame. The scene may include foreground objects and background objects. Foreground objects may include objects that are close to the camera. Background objects may include objects that are farther away from the camera. An image processor may identify pixel values from a frame that depict foreground objects (foreground pixel values) and pixel values from the frame that depict background objects (background pixel values). In subsequent processing, the image processing system may treat foreground pixel values different from background pixel values. For example, the image processor system may distinguish foreground and background pixel values by blurring background pixel values and/or sharpening foreground pixel values. In some examples, the image processor system may modify the colors of the pixel values to accentuate the difference between foreground and background pixel values. For example, background pixel values may be converted to greyscale, foreground pixel values may be color enhanced, etc. Also, because foreground pixel values are more likely to depict objects-of-interest, in some examples, foreground pixel values may be targeted for other image processing, such as object recognition, etc.

When a frame is captured by a camera that is stationary or is moving in a linear manner, foreground pixel values can sometimes be distinguished from background pixel values due to differences in motion. For example, because of parallax, foreground objects appear to move across the captured scene faster than background objects. The image processor system may identify pixel values depicting fast-moving objects as foreground pixel values and identify pixel values depicting stationary or slow-moving objects as background pixel values. When the motion of the camera is more complex, however, all of the pixel values may depict moving objects, making it difficult to distinguish between foreground and background.

In various examples, the image processor may determine a model of the camera motion (a camera motion model) and may compare the motion depicted at different pixel values to the camera motion model. The image processor may compare the motion depicted by some or all of the pixel values to the camera motion model to determine pixel values depicting motion that matches the camera motion model and pixel values depicting motion that does not match the camera motion model. Pixel values depicting motion that matches the camera motion model may be background pixel values. Pixel values depicting motion that does not match the camera motion model may be foreground pixel values.

In some examples, the image processor may select scene points in a frame. A scene point may be a location in the scene depicted by the frame. In a single frame, a scene point may be depicted at a scene point location on the two-dimensional grid corresponding to the position of the pixel value or pixel values depicting the scene point. When either the camera or the scene point is moving, the scene point can appear at different positions in different video frames. The image processor may select scene points at uniformly-spaced positions over the two-dimensional grid, or not at uniformly-spaced positions, for example, as described herein. The motion of a scene point may be determined by considering previous frames from a video frame sequence. For example, a scene point may be described by a trajectory. The trajectory of a scene point in any given frame, referred to as a subject frame, may be a vector describing the motion of a scene point on the two-dimensional grid between a previous frame and the subject frame. For example, a trajectory may be a collection of locations of the scene point across multiple frames (e.g., consecutive frames according to the sequence). In some examples, each location may be described by a set of X-axis and a Y-axis coordinates. The trajectory may be a vector formed by concatenating the X-axis and Y-axis coordinates for each scene point location. Accordingly, the trajectory vector for a scene point may have a number of dimensions equal to twice the number of considered frames. A displacement may be a scalar value describing the distance between the scene point position in the previous frame and the scene point position in the subject frame. (Additional descriptions of trajectory and displacement are described herein with respect to FIG. 2.)

FIG. 1 is a diagram showing one example of an environment 10 for detecting foreground regions in a frame. A camera 2 captures a frame 4a depicting all or part of a three-dimensional scene 5. In the example of FIG. 1, the camera 2 is a panoramic camera with a 360° field-of-view. The three-dimensional scene 5 may comprise example objects 18, 20, 22. Positions in the three-dimensional scene 5, in some examples, may be described on the x-axis, y-axis, and z-axis shown in FIG. 1, although any other suitable three-dimensional coordinate system may be used to describe the three-dimensional scene 5.

The camera 2 may capture a depiction of the three-dimensional scene 5, including example objects 18, 20, and 22 on the two-dimensional frame 4a. In FIG. 1, the frame 4a is shown both positioned around the camera 2 and in flattened-form as part of a video frame sequence 7 that also includes frames 4b, 4c, and 4n. Positioned around the camera 2, the frame 4a demonstrates how the objects 18, 20, 22 from the scene 5 appear on the frame 4a. Pixel values of the frame 4a may be arranged according to a two-dimensional grid illustrated by the X-axis and the Y-axis. Because the example camera 2 has a 360° field-of-view, the frame 4a also comprises a seam 16 along which the frame 4a may be split for two-dimensional storage and/or playback, as shown, for example, at the lower portion of FIG. 1. There, edges 24, 26 of the frame 4a are shown. These edges may represent either side of the seam 16. Accordingly, the portion of the scene 5 depicted by pixel values at or near the edge 24 may be adjacent the portion of the scene 5 depicted by pixel values at or near the edge 26.

The camera 2 may comprise any combination of image sensors or optical components that generate a 360° field-of-view. For example, the camera 2 may comprise a single image sensor (not shown) and a shaped mirror to reflect 360° of the scene 5 surrounding the camera 2 onto the image sensor. In other examples, the camera 2 may comprise multiple image sensors (not shown) that simultaneously, or nearly simultaneously, capture frames including portions of the scene surrounding the camera 2. The camera 2 (or other suitable image processor) may stitch the frames together to form a panoramic frame. Also, although the camera 2 shown in FIG. 1 has a 360° field-of-view, some examples of the systems and methods for detecting foreground regions in image and video frames described herein may be executed on frames captured by cameras with less than a 360° field-of-view.

The video frame sequence 7 may comprise the frame 4a as well as frames 4b, 4c, 4n that may have been captured by the camera 2 of the three-dimensional scene 5 before the frame 4a was captured. Although four frames 4a, 4b, 4c, 4n are shown in the video frame sequence 7, any suitable number of frames may be included in the video frame sequence 7 or other suitable video frame sequences. The camera 2 may capture the frames 4a, 4b, 4c, 4n and provide the frames 4a, 4b, 4c, 4n to an image processor 6. The image processor 6 may be a component of the camera 2 or may be a remote image processor, as described herein. The image processor 6 may analyze the frames 4a, 4b, 4c, 4n to identify foreground and/or background regions. In some examples, the image processor 6 may also perform various modifications to the frames 4a, 4b, 4c, 4n, including, for example, changing the color, clarity or other features of the foreground regions relative to background regions.

In some examples, the image processor 6 may identify scene point locations in the various frames 4a, 4b, 4c, 4n where scene points are depicted on the frames. Scene point locations are represented in FIG. 1 as dots on the frame 4a. Example scene point locations 28a, 28b, 28c, 28d are labeled in FIG. 1. Each scene point location, including examples 28a, 28b, 28c, 28d, may be represented by a position on the two-dimensional grid described by the X-axis and the Y-axis or any other suitable two-dimensional coordinate system. In the example of FIG. 1, the scene point locations are uniformly distributed across the two-dimensional grid of the frame 4a. For example, the location of each scene point in the frame 4a may be equidistant from adjacent scene points. In some examples, the image processor 6 may modify the spatial distribution of scene points, as described herein with respect to FIG. 6.

Figure 2:
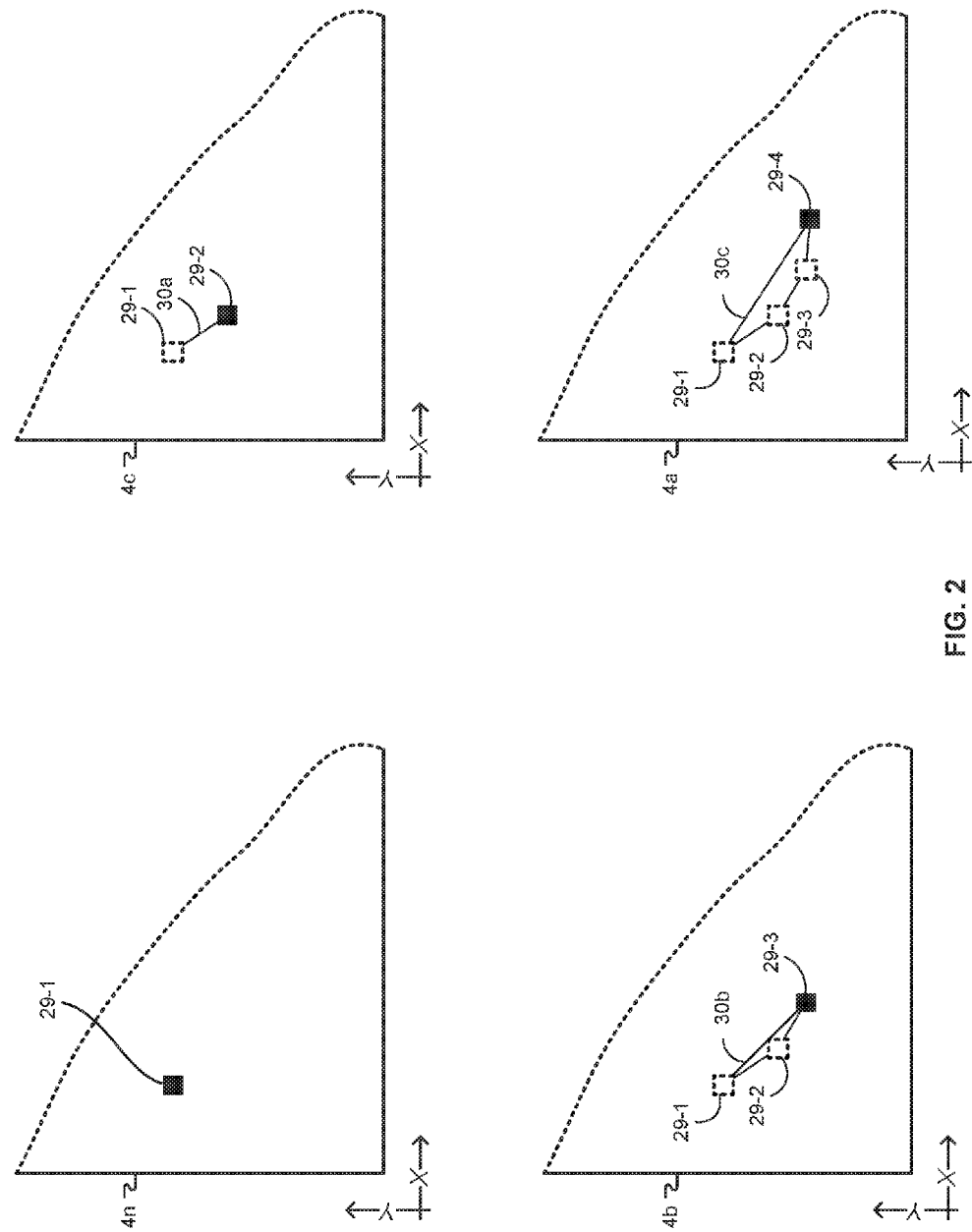
FIG. 2 is a diagram showing one example of a trajectory of the example scene point as depicted in example frames.

In some examples, the image processor 6 may determine a trajectory and/or displacement for one or more scene points across multiple frames. For example, FIG. 2 is a diagram showing one example of trajectories and displacements of the example scene point depicted in frames 4a, 4b, 4c, 4n of the video frame sequence 7. The image processor 6 may be programmed to identify the depictions of the example scene point in the different frames. In FIG. 2, at frame 4n, the scene point is positioned at a scene point location 29-1, which may be represented by a pair of X-axis and Y-axis coordinates. Next, at frame 4c (captured after frame 4n according to the video frame sequence 7), the example scene point may be depicted at position 29-2, represented by a second pair of X-axis and Y-axis positions. The scene point position 29-1 is also shown on frame 4c in dotted form to illustrate the distance 30a between the scene point positions 29-1 and 29-2. This scalar value of this distance may be the displacement of the scene point between the frame 4n and the frame 4c. The displacement may have an X-axis component corresponding to the X-axis distance between scene point locations 29-1 and 29-2 as well as a Y-axis component corresponding to the Y-axis distance between scene point locations 29-1 and 29-2. Referring to frame 4b (captured after frame 4c), the example scene point may be depicted at scene point location 29-3. Scene point locations 29-1 and 29-2 are also shown on frame 4b in dotted form. The scalar value of the distance 30b between the scene point positions 29-1 and 29-3 may be the displacement of the scene point between frame 4n and frame 4b. In frame 4a, the example scene point is depicted at scene point position 29-4. A the scalar value of the distance 30c between the position 29-1 and the position 29-4 may be the displacement of the example scene point between frame 4n and frame 4a.

The trajectory of the scene point depicted in FIG. 2 may be found by concatenating the coordinates the respective scene point locations 29-1, 29-2, 29-3, 29-4. For example, Equation [1A] below illustrates an example trajectory vector, T:

$$T = \{29\text{-}1_X, 29\text{-}2_X, 29\text{-}3_X, 29\text{-}4_X, 29\text{-}1_Y, 29\text{-}2_Y, 29\text{-}3_Y, 29\text{-}4_Y\} \quad [1A]$$

In the trajectory given by [1A], the X-axis values for the respective scene point locations 29-1, 29-2, 29-3, 29-4 are first, followed by the Y-axis values for the scene point locations 29-1, 29-2, 29-3, 29-4. Accordingly, the trajectory vector T, derived from four frames, is an eight dimensional vector. The coordinates of the respective scene point locations 29-1, 29-2, 29-3, 29-4 may be concatenated in different manners. Equation [1B] illustrates another example trajectory vector, T' derived from the scene point locations 29-1, 29-2, 29-3, 29-4:

$$T = \{29\text{-}1_X, 29\text{-}1_Y, 29\text{-}2_X, 29\text{-}2_Y, 29\text{-}3_X, 29\text{-}3_Y, 29\text{-}4_X, 29\text{-}4_Y\} \quad [1B]$$

In some examples, trajectory vectors for scene points in the same subject frame may be found with the same type of concatenation. For example, if the trajectory for one scene point is found according to Equation [1A], then trajectories for other scene points in the same frame may be also be found according to Equation [1A].

Referring back to FIG. 1, the image processor 6 may utilize trajectories and/or displacements for the various scene points to generate a camera motion model. The scene points from the frame 4a may be compared to the camera motion model to identify scene points that are moving with the model, which may be part of a background region, and scene points that are not moving with the model, which may be part of a foreground region. Scene points determined to be part of a foreground region may be extrapolated to identify foreground regions, as described herein.

Any suitable type of camera motion model may be used. In some examples, the image processor 6 may generate a sinusoidal displacement model 12. According to a sinusoidal displacement model 12, the image processor 6 may divide the frame 4a into columns, such as the example columns 32a, 32b, 32c, 32d, 32d, 32f, 32g, 32h, 32i shown in FIG. 1. The image processor 6 may determine an average X-axis displacement and an average Y-axis displacement of scene points depicted in each column over a number of previous frames of the video frame sequence 7. The image processor 6 may fit a first sinusoidal function to the average X-axis displacement by column and a second sinusoidal function to the average Y-axis displacement by column. For example, the first sinusoidal function may map average Y-axis displacement to X-axis position. The second sinusoidal function may map average X-axis displacement to X-axis position. The image processor 6 may compare the displacement of any given scene point to the model by finding a difference between the X-axis and Y-axis displacements of the scene point and the X-axis and Y-axis displacement predicted by the first and second sinusoidal functions. Additional details are provided herein, for example, with respect to FIGS. 10-11.

In some examples, the image processor 6 may generate a vector subspace model 14 of camera motion. According to a vector subspace model, the image processor 6 may generate a vector subspace using three scene point trajectories as basis vectors. In some examples, the vector subspace may be a rank-3 subspace. The three basis vectors may be selected from the trajectories of the scene points depicted at scene point locations in the subject frame (e.g., frame 4a). In some examples, the image processor 6 may generate the vector subspace model 14 using random sampling and consensus (RANSAC). The image processor 6 may randomly select a set of three scene point trajectories from the scene points depicted at scene point locations in the frame and build a trial subspace with the randomly-selected trajectories as basis vectors for the trial subspace. In some examples, the image processor 6 may test each randomly-selected set of three scene point trajectories for linear independence. If a set of three scene point trajectories is not linearly independent, it may be discarded and a new set of three scene point trajectories selected in its place.

The image processor 6 may then find a projection error from at least a portion of the remaining scene point trajectories to the trial subspace. The projection error may describe a scalar distance between a scene point trajectory and its projection onto the trial subspace. Scene point trajectories that are part of the trial subspace (e.g., the selected basis vectors) may have a projection error of zero. The image processor 6 may build multiple trial subspaces in this way. Any suitable number of trial subspaces may be built including, for example, 40. In some examples, the image processor may select the trial subspace that is the best fit for the scene point trajectories of the scene points depicted by the scene point locations in a frame or frame section. The best fit may be determined in any suitable manner. In some examples, the best fit trial subspace may be the trial subspace having the highest number of scene point trajectories with projection errors less than a projection error threshold. Also, in some examples, the best fit trial subspace may be the trial subspace for which the average projection error and/or sum of all projection errors is lowest.

When a vector subspace model 14 is selected from among the trial subspaces, the image processor 6 may classify scene points as foreground or background. For example, a scene point with a trajectory having a projection error to the vector subspace model 14 that is less than a projection error threshold may be classified as a background scene point. A scene point with a trajectory having a projection error to the vector subspace model 14 that is greater than the projection error threshold may be classified as a foreground scene point.

In some examples, vector subspace models 14 may more accurately describe the camera motion when orthographic assumptions hold. Orthographic assumptions may hold when lines that are parallel in the scene 5 are also parallel (or close to parallel) in the frame 4a. In a typical frame, however, orthographic assumptions are valid only over portions of the frame. Accordingly, in some examples, a subject frame 4*a* may be divided into sections, such as columns 32*a*, 32*b*, 32*c*, 32*d*, 32*e*, 32*f*, 32*g*, 32*h*, 32*i*. A separate vector subspace model 14 may be generated for each column 32*a*, 32*b*, 32*c*, 32*d*, 32*e*, 32*f*, 32*g*, 32*h*, 32*i*.

Figure 3:
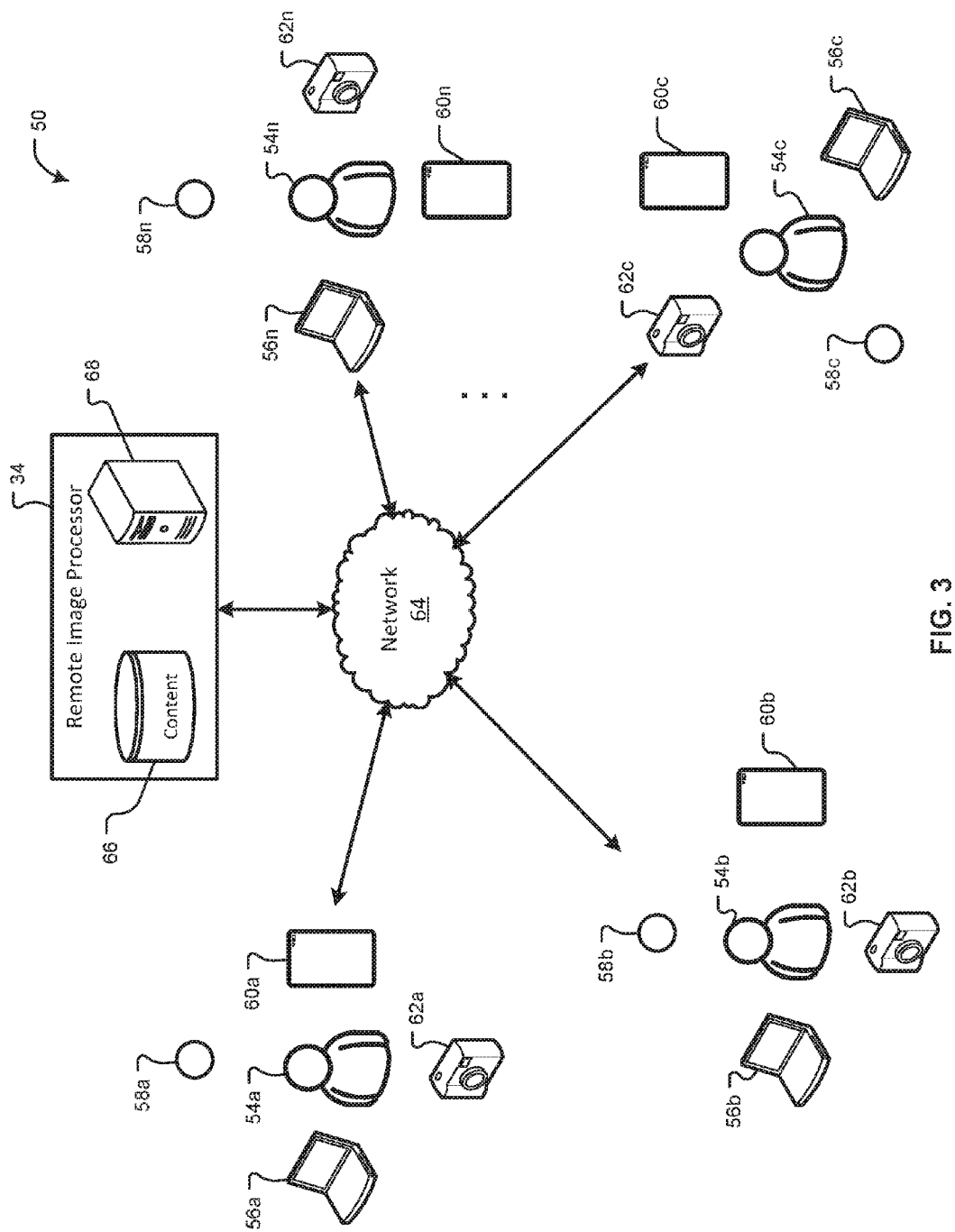
FIG. 3 is a diagram showing another example of the environment of FIG. 1 including additional components.

FIG. 3 is a diagram showing another example of the environment 10 including additional components. As shown in FIG. 3, the environment 10 comprises the remote image processor system 34 and users 54*a*, 54*b*, 54*c*, 54*n*. Each user 54*a*, 54*b*, 54*c*, 54*n* may use one or more computing devices such as, for example, panoramic cameras 58*a*, 58*b*, 58*c*, 58*n*, digital cameras 62*a*, 62*b*, 62*c*, 62*n*, mobile devices 60*a*, 60*b*, 60*c*, 60*n*, or other computing devices 56*a*, 56*b*, 56*c*, 56*n*. Although four users 54*a*, 54*b*, 54*c*, 54*n* are shown, any suitable number of users 54*a*, 54*b*, 54*c*, 54*n* may be part of the environment. Also, although each user 54*a*, 54*b*, 54*c*, 54*n* shown in FIG. 3 is associated with a panoramic camera 58*a*, 58*b*, 58*c*, 58*n*, a mobile device 60*a*, 60*b*, 60*c*, 60*n*, a digital camera 62*a*, 62*b*, 62*c*, 62*n*, and a computing device 56*a*, 56*b*, 56*c*, 56*n*, some users 54*a*, 54*b*, 54*c*, 54*n* may use more, fewer, or different types of devices than what is shown. The environment 10 may also comprise a remote image processor system 34, which also comprises a computing device. The remote image processor system 34 may comprise one or more servers 68 and one or more data storage devices 66.

Computing devices may be utilized to capture image frames either for singular images or as part or all of a video. Computing devices may also perform various processing on captured image frames. In some examples, one or more computing devices may detect foreground objects in one or more video frames, as described herein. Panoramic cameras 58*a*, 58*b*, 58*c*, 58*n* may include one or more image sensors and associated optics to capture panoramic frames (e.g., images and/or videos) as described herein. Panoramic cameras 58*a*, 58*b*, 58*c*, 58*n* may have a panoramic field-of-view larger than that of a standard camera. For example, panoramic cameras 58*a*, 58*b*, 58*c*, 58*n* may have a field-of-view of about 180° or greater. Some panoramic cameras 58*a*, 58*b*, 58*c*, 58*n* may have fields-of-view as large as 360° and/or $4\pi$ steradians, as described herein. In some examples, a panoramic camera 58*a*, 58*b*, 58*c*, 58*n* may comprise a single image sensor with lenses, mirrors or other optics allowing the single image sensor to receive electromagnetic radiation (e.g., light) from the panoramic field-of-view. In some examples, a panoramic camera 58*a*, 58*b*, 58*c*, 58*n* may comprise multiple image sensors (e.g., with overlapping fields-of-view). The panoramic camera 58*a*, 58*b*, 58*c*, 58*n* (or another component of the environment 10) may be configured to stitch frames from the respective image sensors into a single panoramic frame. In some examples, a panoramic camera 58*a*, 58*b*, 58*c*, 58*n* may be configured to communicate with other components of the environment 10 utilizing, for example, a wired or wireless connection. For example, a panoramic camera 58*a*, 58*b*, 58*c*, 58*n* may upload a frame or frames to a companion user device, such as, a mobile device 60*a*, 60*b*, 60*c*, 60*n* or computing device 56*a*, 56*b*, 56*c*, 56*n* via a wired connection, such as Universal Serial Bus (USB), or wireless connection, such as near field communication (NFC) or Bluetooth. In some examples, a panoramic camera 58*a*, 58*b*, 58*c*, 58*n* may be configured to upload frames directly to the remote image processor system 34, for example, via the network 64.

Digital cameras 62*a*, 62*b*, 62*c*, 62*n* may comprise any suitable device with one or more image sensors to capture an image and/or video. In some examples, digital cameras 62*a*, 62*b*, 62*c*, 62*n* may be configured to communicate with other components of the environment 10 utilizing, for example, a wired or wireless connection. For example, a digital camera 62*a*, 62*b*, 62*c*, 62*n* may upload images and/or videos to a mobile device 60*a*, 60*b*, 60*c*, 60*n* or computing device 56*a*, 56*b*, 56*c*, 56*n* via a wired connection, such as Universal Serial Bus (USB), or wireless connection, such as near field communication (NFC) or Bluetooth. In some examples, a digital camera 62*a*, 62*b*, 62*c*, 62*n* may be configured to upload images and/or video directly to a remote image processor system 34, for example, via the network 64. Also, in some examples, a digital camera 62*a*, 62*b*, 62*c*, 62*n* may comprise a processor and/or other components to implement video compression, as described herein. Digital cameras 62*a*, 62*b*, 62*c*, 62*n* may have one or more than one image sensor and may have a standard or panoramic field-of-view.

A mobile device 60*a*, 60*b*, 60*c*, 60*n* may be any suitable type of computing device comprising a processor and data storage. In some examples, a mobile device 60*a*, 60*b*, 60*c*, 60*n* may be configured to receive frames captured by a panoramic camera 58*a*, 58*b*, 58*c*, 58*n* or digital camera 62*a*, 62*b*, 62*c*, 62*n* and transfer the frames to the remote image processor system 34. In some examples, a mobile device 60*a*, 60*b*, 60*c*, 60*n* may execute a remote image processor for enhancing frames and/or videos received, for example, from a panoramic camera 58*a*, 58*b*, 58*c*, 58*n* or digital camera 62*a*, 62*b*, 62*c*, 62*n*. Also, in some examples, a mobile device 60*a*, 60*b*, 60*c*, 60*n* may comprise one or more image sensors and associated optics for capturing video and either uploading the video to the remote image processor system 34 or performing compression, as described herein. In some examples, a mobile device 60*a*, 60*b*, 60*c*, 60*n* may be configured to communicate on a cellular or other telephone network in addition or instead of the network 64.

Other computing devices 56*a*, 56*b*, 56*c*, 56*n* may be any suitable type of computing device comprising a processor and data storage including, for example, a laptop computer, a desktop computer, etc. In some examples, a computing device 56*a*, 56*b*, 56*c*, 56*n* may be configured to receive image frames captured by a panoramic camera 58*a*, 58*b*, 58*c*, 58*n* or digital camera 62*a*, 62*b*, 62*c*, 62*n* and transfer the image frames to the remote image processor system 34. In some examples, a computing device 56*a*, 56*b*, 56*c*, 56*n* may be configured to execute an image processor for processing videos received, for example, from a panoramic camera 58*a*, 58*b*, 58*c*, 58*n* or digital camera 62*a*, 62*b*, 62*c*, 62*n*. Also, in some examples, a computing device 56*a*, 56*b*, 56*c*, 56*n* may comprise one or more image sensors and associated optics for capturing video and either uploading the video to the remote image processor system 34 or performing compression locally.

The remote image processor system 34 may perform various processing on image frames received from users 54*a*, 54*b*, 54*c*, 54*n* (e.g., user devices associated with the user). For example, the image processor system 34 may identify objects or other content-of-interest in frames received from users 54*a*, 54*b*, 54*c*, 54*n*. This may allow user devices, such as the panoramic cameras 58*a*, 58*b*, 58*c*, 58*n*, to turn off one or more image sensors, as described herein. In some examples, the remote image processor system 34 may perform other processing on frames received from the users 54*a*, 54*b*, 54*c*, 54*n*. For example, the remote image processor system 34 may perform various enhancements to frames received from the user devices.

The remote image processor system 34 may comprise one or more data stores 66 and one or more servers 68. The data store 66 may store panoramic frames and/or transmission frames received from the various user devices. The various components 68, 66 of the remote image processor system 34 may be at a common geographic location and/or may be distributed across multiple geographic locations. For example, the remote image processor system 34 may be implemented in whole or in part as a cloud or Software as a Service (SaaS) system. In some examples, the remote image processor system 34 may communicate with multiple different users 54a, 54b, 54c, 54n (e.g., via their associated cameras, computing devices, or other devices). The various components of the environment 10 may be in communication with one another via a network 64. The network 64 may be and/or comprise any suitable wired or wireless network configured according to any suitable architecture or protocol. In some examples, the network 64 may comprise the Internet.

Figure 4:
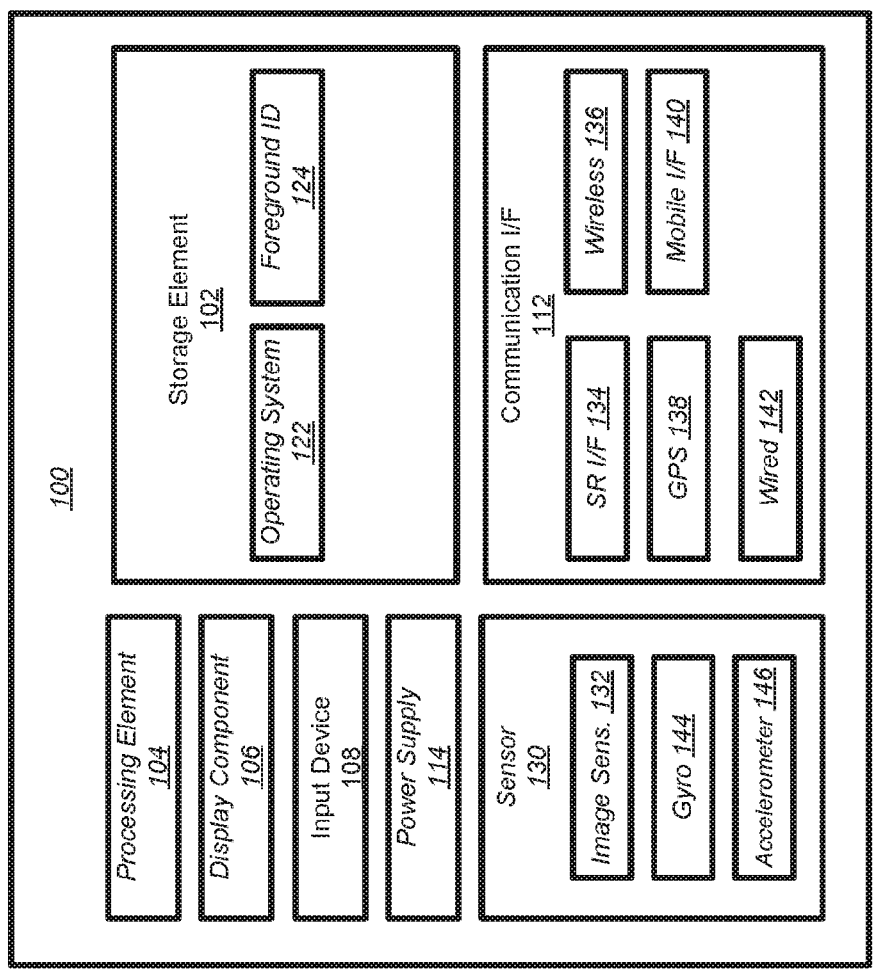
FIG. 4 is a block diagram showing an example architecture of a computing device.

FIG. 4 is a block diagram showing an example architecture 100 of a computing device. It will be appreciated that not all computing devices will include all of the components of the architecture 100 and some computing devices may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc. The storage element 102 may also store software for execution by the processing element 104. An operating system 122 may provide the user with an interface for operating the computing device and may facilitate communications and commands between applications executing on the architecture 100 and various hardware thereof. A foreground identification utility 124 may compress binary masks, as described herein.

When implemented in some computing devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor system 34. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth, Bluetooth LE, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more motion sensors. Some examples of the architecture 100 may include multiple image sensors 132. Motion sensors may include any sensors that sense motion of the architecture including, for example, gyroscopes 144 and accelerometers 146. The gyroscope 144 may be configured to generate a signal indicating rotational motion and/or changes in orientation of the architecture (e.g., a magnitude and/or direction of the motion or change in orientation). Any suitable gyroscope may be used including, for example, ring laser gyroscopes, fiber-optic gyroscopes, fluid gyroscopes, vibration gyroscopes, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138. Other types of motion sensors that may be included in the architecture 100 include digital compass sensors, other location sensors (e.g., utilizing beacon signals or time stamps to determine a current or past location of the architecture), time-of-flight or other depth sensors, etc. In some examples, an image sensor may also be a motion sensor.

Figure 5:
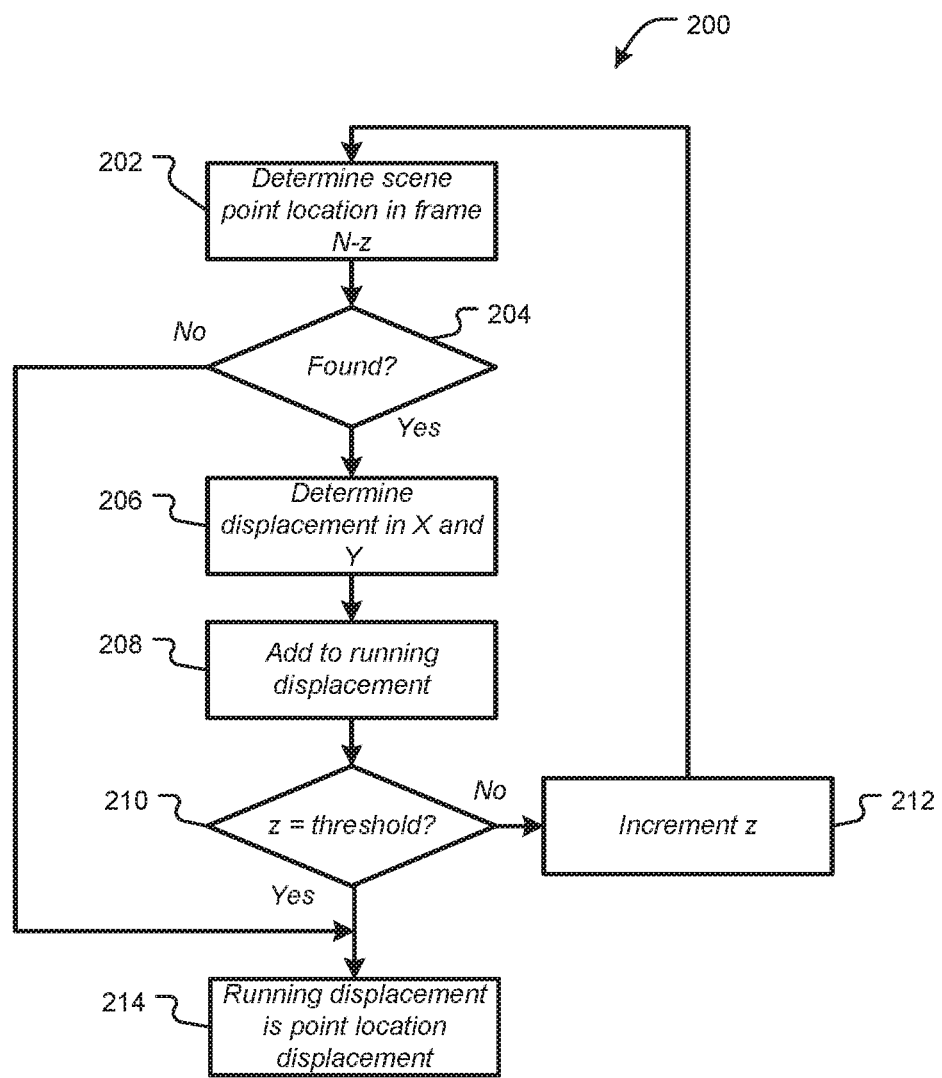
FIG. 5 is a flow chart showing one example of a process flow that may be executed by an image processor to find a displacement for a scene point depicted in a frame.

FIGS. 5-9 show flow charts and diagrams illustrating certain pre-processing that may be performed by an image processor, in some examples, prior to finding a camera motion model. In different examples, the image processor may perform some, all, or none of the pre-processing described in FIGS. 5-9. FIG. 5 is a flow chart showing one example of a process flow 200 that may be executed by an image processor to find a displacement for a scene point depicted in a subject frame. The process flow 200 may consider the subject frame and one or more frames prior to the subject frame in a video frame sequence. The frame operated on at any particular action is referred to herein as the subject frame. At 202, the image processor may determine the location of a scene point in a subject frame N-z. N may indicate the subject frame (e.g., the frame in which foreground and background regions are being detected). For example, N may be a number describing the position of the subject frame in a video frame sequence. The variable z may be a counter used to count backwards in the video frame sequence from the subject frame. For example, at the beginning of an execution of the process flow 200, the counter variable z may be zero and the image processor may locate the scene point in the subject frame at 202. The scene point location in the subject frame may be determined by the placement of the scene points in the subject frame, as described herein. Scene point locations may be described by a position on the X-axis and a position Y-axis, as described herein, or by any other suitable two-dimensional coordinate system.

At 204, the image processor may determine whether the position of the scene point was located at 202. If yes, then the image processor may determine an X-axis and Y-axis displacement of the scene point position relative to the position of the same scene point in the last-considered frame according to the video frame sequence. The X-axis and Y-axis displacements may be added to running displacements at 208. For example, the image processor may maintain a running X-axis displacement of the scene point and a running Y-axis displacement of the scene point. At 210, the image processor may determine whether the counting variable z is greater than a threshold. The threshold may indicate a number of frames prior to the subject frame in the video frame sequence that are to be considered to determine the trajectory or displacement. If the counting variable z is less than the threshold, then the image processor may increment z and proceed to 202.

At 202, the image processor may locate the scene point in the next subject frame, which may be immediately prior to the last subject frame. Locating the scene point may be done in any suitable manner. In some examples, the image processor may examine pixel values at and/or around the position of the scene point in the subject frame and/or other previously subject frames and identify similar or identical pixel values. In some examples, the image processor may execute a Kanade-Lucas-Tomasi (KLT) tracking algorithm to locate the scene point in the subject frame. Returning again to 204, the image processor may determine whether the scene point was found in the subject frame. For example, if the scene point is occluded in the subject frame, it may not be found. If a scene point is occluded, in some examples, the image processor may truncate the trajectory of the scene point. For example, if the scene point is not found, the image processor may proceed to 214 and the current running X-axis and Y-axis displacements may be the displacements for the scene point. In some examples, the image processor may discard the considered scene point if it does not appear in the frame. Referring again to 210, if z is equal to the threshold, then the image processor may proceed to 214 and set the current X-axis and Y-axis running displacements to be the displacements for the scene point. In some examples, instead of keeping a running displacement, the image processor may determine the displacement at 214 after all scene point locations for the scene point in the have been determined in the considered frames. In some examples, the process flow 200 may be executed once for every scene point in a frame or frame section for which a displacement is to be found.

The trajectory for a scene point may be found in a manner similar to what is described in FIG. 5. For example, the image processor may traverse backwards along the video sequence for a predetermined number of frames, finding a scene point location for the scene point in each frame. The trajectory for the scene point may be found by concatenating the X-axis and Y-axis coordinates for the scene point locations in each frame. If a scene point is occluded in any of the frames, in some examples, the image processor may discard the scene point and not consider it further. For example, at least in some examples, all scene point trajectories from a subject frame may be of the same length.

Figure 6:
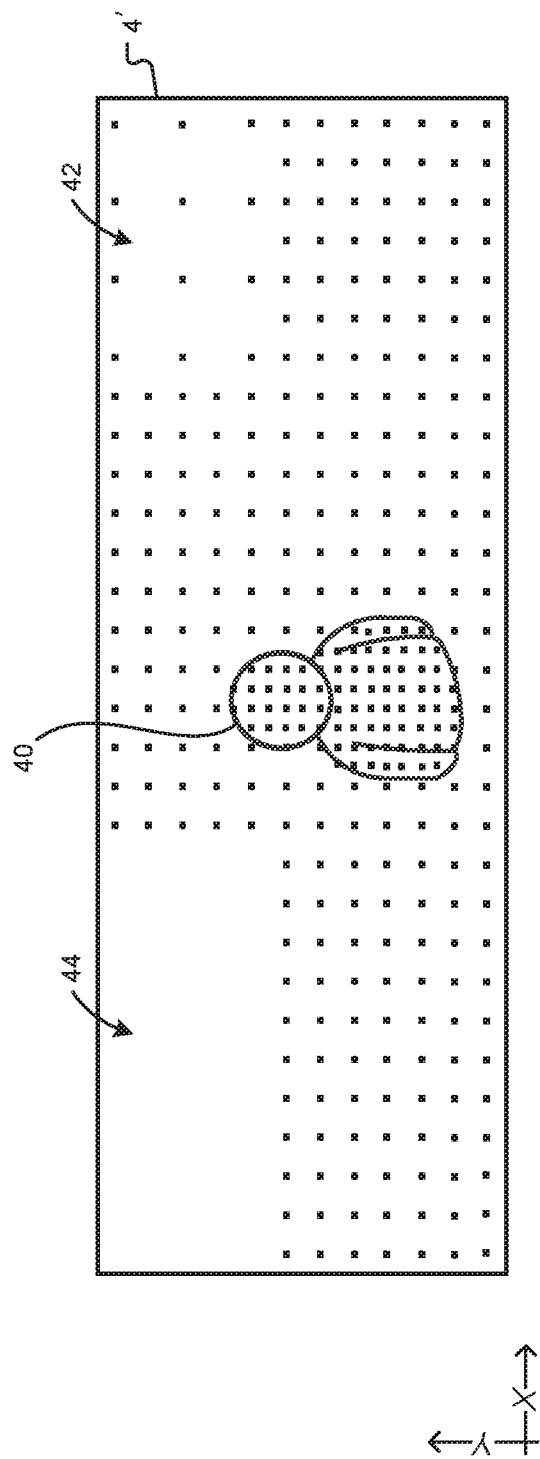
FIG. 6 is a diagram showing an example frame illustrating a non-uniform distribution of scene point locations.

FIG. 6 is a diagram showing an example frame 4' illustrating a non-uniform distribution of scene point locations. For example, an image processor may be programmed to increase the density of scene point locations in areas of the frame 4' that comprise objects, such as object 40 and decrease the density of scene points in areas of the frame 4' that do not comprise objects, such as area 42. For example, the image processor may be programmed to execute an object recognition algorithm. Any suitable object recognition algorithm may be used. If the image processor detects a portion of the frame 4' that includes an object, then it may increase the density of scene points in that portion. For example, in the frame 4', the density of scene points in the area depicting the object 40 is doubled relative to the rest of the frame 4'. Any suitable increase or decrease in scene point density may be used, however. Also, the density of scene points in the area 42, which depicts no object, is halved relative to the rest of the frame 4'. For determining the model or models 12, 14, distributing scene points in this may accentuate the weighting of regions of the frame 4' including objects and decrease the weighting of regions of the frame 4' that do not include objects.

Figure 7:
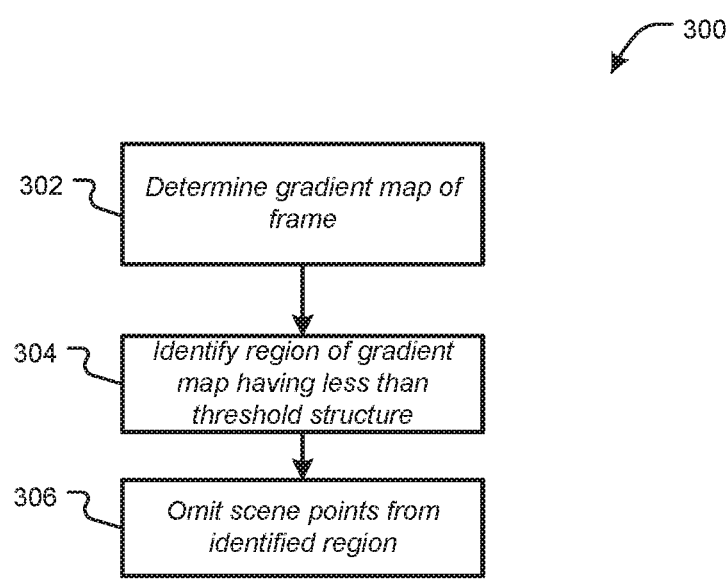
FIG. 7 is a flow chart showing one example of a process flow that may be executed by an image processor to identify low-texture regions of a frame and omit scene points therefrom.

In some examples, scene point trajectories from low-texture regions of a frame may comprise high levels of noise, in the form of spurious scene point trajectories and displacements, which may compromise the accuracy of the camera motion model or models 12, 14. FIG. 7 is a flow chart showing one example of a process flow 300 that may be executed by an image processor to identify low-texture regions of a frame and omit scene points therefrom. At 302, the image processor may determine a gradient map of the frame 4'. The gradient map may indicate a level of texture in the frame 4'. The image processor may determine the gradient map in any suitable manner. For example, the image processor may apply a gradient filter to the frame 4'. An output of the gradient filter may be a gradient map indicating a gradient of the frame 4' by position on the X-axis and Y-axis. The gradient map may reflect changes in pixel values across the frame 4'. For example, locations of the gradient map with higher gradient values may depict areas of higher contrast or texture, such as object edges. Locations on the gradient map with lower gradient values may depict areas of lower contrast or texture. Any suitable gradient filter may be applied including, for example, a derivative of a Gaussian filter, a Sobel filter, etc. At 304, the image processor may identify at least one region of the frame that has less than a threshold level of texture. For example, regions having less than a threshold level of texture may be regions with corresponding gradient map values less than a threshold value. At 306, the image processor 306 may omit scene points from a region or regions identified at 304. For example, referring to FIG. 6, the frame 4' comprises a region 44 with a texture level less than a texture threshold. Accordingly, scene point locations are omitted from the region 44.

Figure 8:
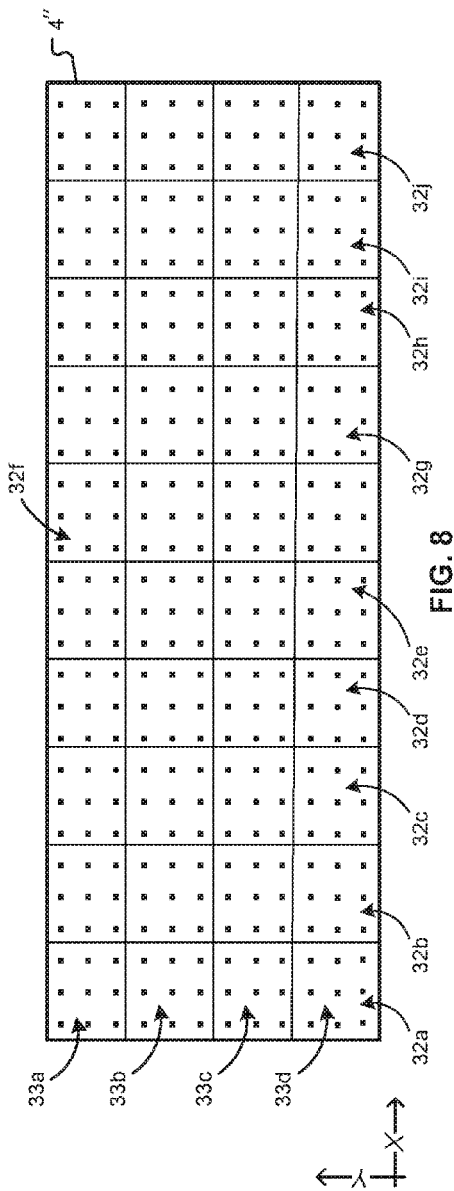
FIG. 8 is a diagram showing one example of a frame that has been divided into columns and rows.

FIG. 8 is a diagram showing one example of a frame 4" that has been divided into columns 32a, 32b, 32c, 32d, 32e, 32f, 32g, 32h, 32i and rows 33a, 33b, 33c, 33d. Each combination of a column 32a, 32b, 32c, 32d, 32e, 32f, 32g, 32h, 32i and a row 33a, 33b, 33c, 33d may be a section. In some examples, the image processor may be configured to generate a separate camera motion model 12, 14 each section or group of sections using the scene points in that section. For example, an image processor may be programmed to generate a separate vector subspace model 14 for each section. In some examples, the image processor may be programmed to generate a separate sinusoidal displacement model 12 for each row 33a, 33b, 33c, 33d. For example, a sinusoidal displacement model 12 may be taken across columns or a group of sections that span the X-axis of a frame 4'''.

Figure 9:
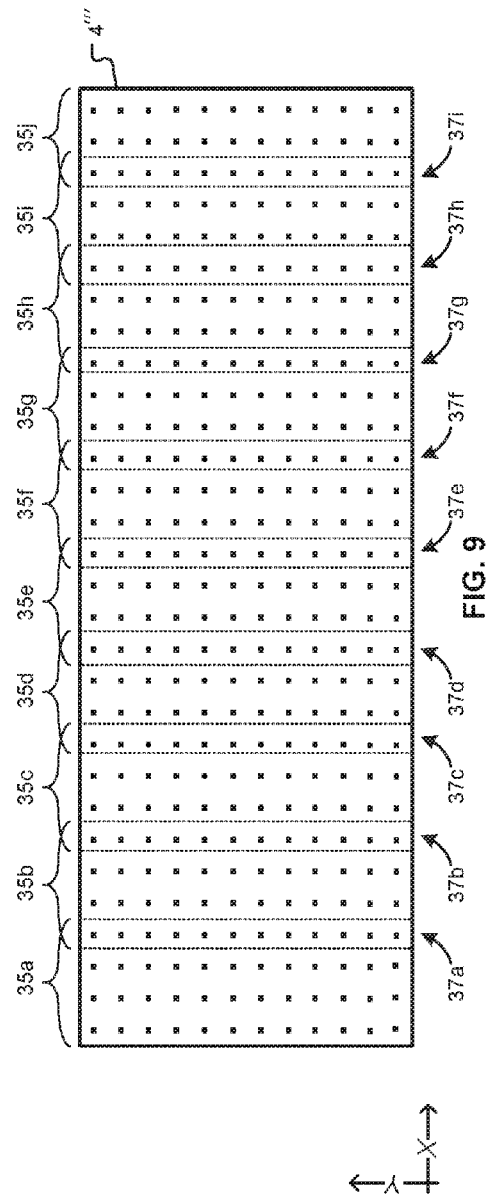
FIG. 9 is a diagram showing one example of a frame that has been divided into overlapping columns.

FIG. 9 is a diagram showing one example of a frame 4''' that has been divided into overlapping columns 35a, 35b, 35c, 35d, 35e, 35f, 35g, 35h, 35i. In some examples, the image processor may be programmed to generate a separate camera motion model 12, 14 for each column 35a, 35b, 35c, 35d, 35e, 35f, 35g, 35h, 35i. Scene points positioned in overlapping sections 37a, 37b, 37c, 37d, 37e, 37f, 37g, 37h, 37i, then, may be part of more than one column 35a, 35b, 35c, 35d, 35e, 35f, 35g, 35h, 35i and therefore part of more than one model 12, 14. The image processor, then, may identify whether scene points in the overlap sections 37a, 37b, 37c, 37d, 37e, 37f, 37g, 37h, 37i are part of a foreground region, in some examples, utilizing all camera motion models that apply to the respective overlap region. For example, the image processor may conclude that a scene point in an overlap region is part of a foreground region only if all camera motion models for the overlap region indicate that the scene point is in the foreground. Also, in some examples, the image processor may apply a voting algorithm and consider a scene point to be in the foreground only if a majority of camera motion models for the overlap region indicate so.

Figure 10:
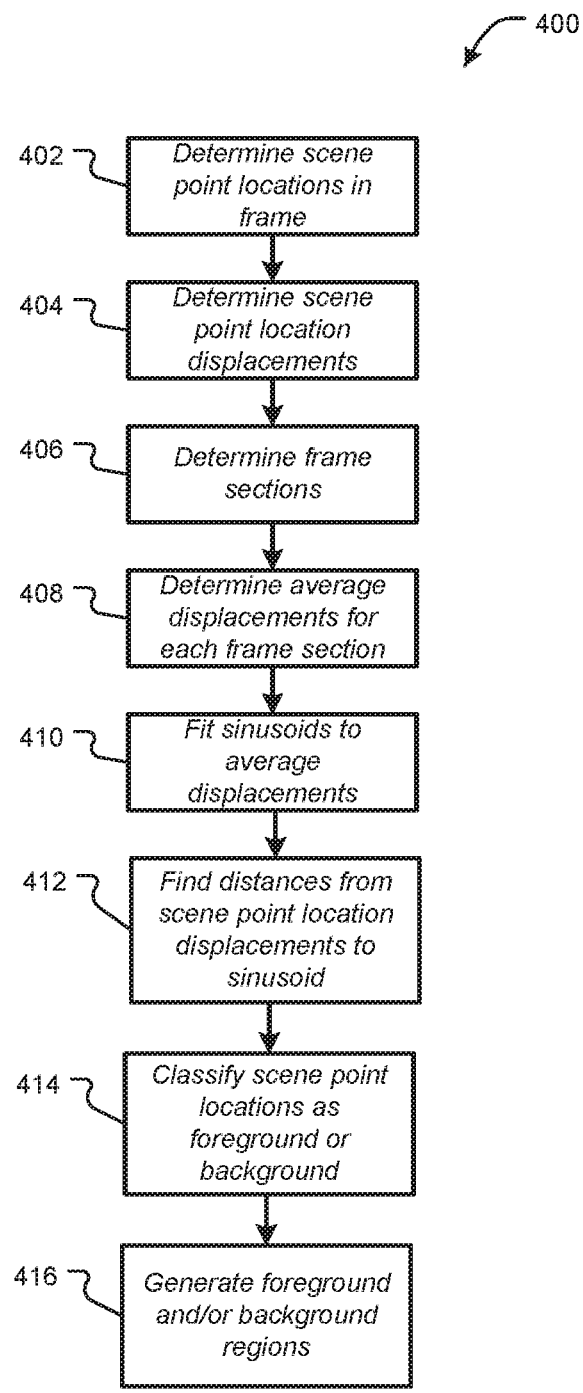
FIG. 10 is a flow chart showing one example of a process flow that may be executed by an image processor to generate and apply a displacement sinusoid model, such as the model described above.
Figure 11:
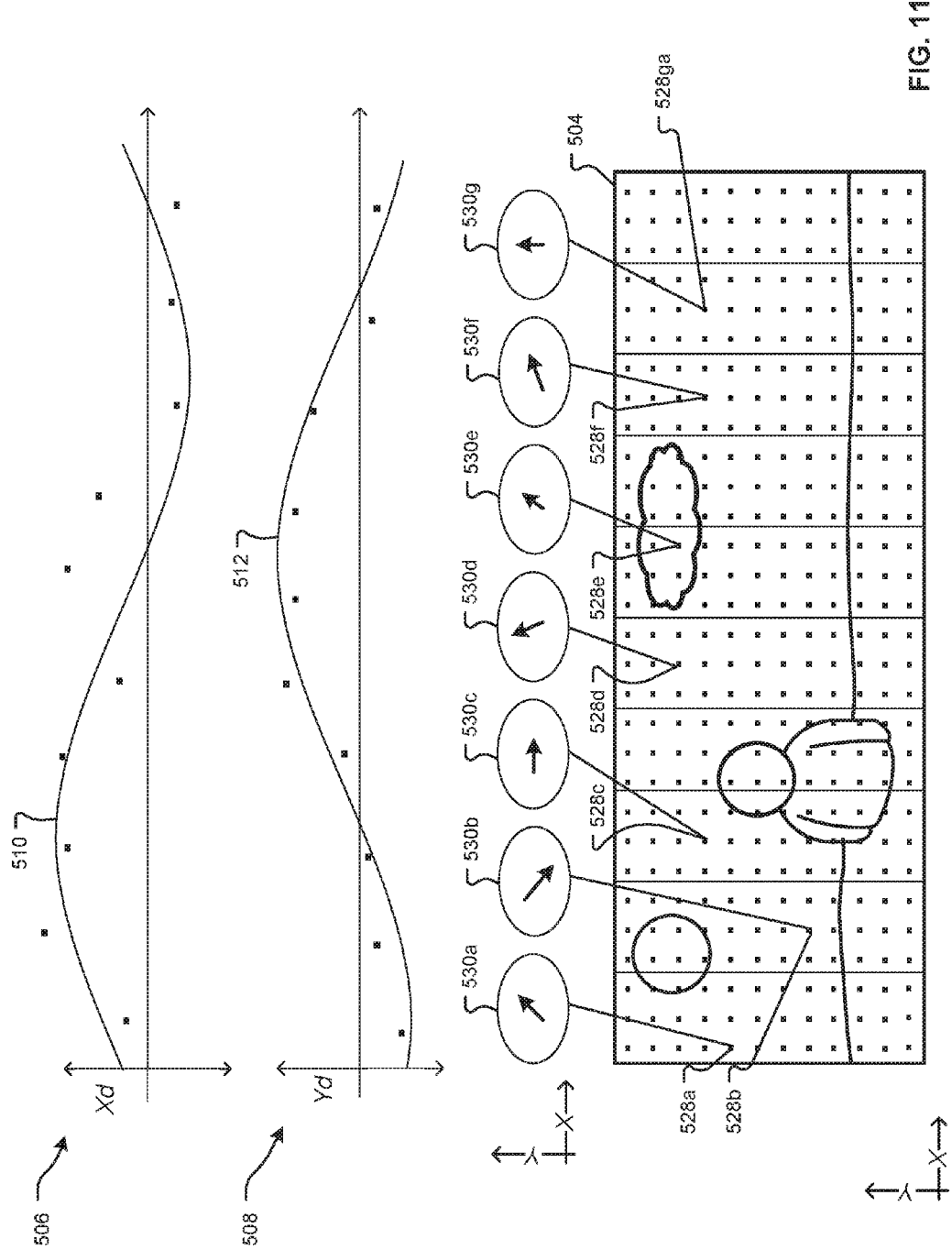
FIG. 11 is a diagram showing one example of a frame and example X displacement and Y displacements sinusoids.

FIG. 10 is a flow chart showing one example of a process flow 400 that may be executed by an image processor to generate and apply a displacement sinusoid model, such as the model 12 described above. FIG. 11 is a diagram showing one example of a frame 504 and example X displacement and Y displacements sinusoids. Referring first to FIG. 10, at 402, the image processor may determine scene point locations in the frame 504. Scene point locations may be uniformly distributed, as shown in FIG. 1, or non-uniformly distributed, for example, as illustrated and described with respect to FIG. 6. At 404, the image processor may determine a displacement for the scene points positioned at 402. Scene point displacement may be determined in any suitable manner, including, for example, as described herein above with reference to FIG. 5. Scene point displacements may be found over any suitable number of frames prior to the subject frame (e.g., frame 504). In some examples, scene point displacements may be found over 15 frames prior to the subject frame according to the video frame sequence. Referring to FIG. 11, depictions of example scene points 528a, 528b, 528c, 528d, 528e, 528f, 528g are depicted by the frame 504. FIG. 11 also illustrates displacements 530a, 530b, 530c, 530d, 530e, 530f, 530g for the example scene points 528a, 528b, 528c, 528d, 528e, 528f, 528g. Each displacement may have an X-axis component and a Y-axis component corresponding to the X-axis displacement and Y-axis displacement.

At 406, the image processor may determine frame sections for the frame 504. Frame sections may be columns, similar to the columns 32a, 32b, 32c, 32d, 32e, 32f, 32g, 32h, 32i of the frame 4a and/or may be sections partitioned along both the X-axis and Y-axis directions, for example, similar to the frame 4'' of FIG. 8. Also, in some examples, sections of the frame 504 may overlap, as described herein with respect to FIG. 9. At 406, the image processor may find average displacements for scene points in the sections of the frame 504. In some examples, the image processor may find an average X-axis displacement for each section and an average Y-axis displacement for each section. The average X-axis displacement for a section may be an average of the X-axis components of the displacements for each scene point in the section. The average Y-axis displacement for a section may be an average of the Y-axis components of the displacements for each scene point in the section.

At 410, the image processor may fit a sinusoid function to the average displacements of 408. In some examples, two sinusoid functions may be fitted, an X-axis sinusoid function and a Y-axis sinusoid function. Referring to FIG. 11, example plot 506 shows an X-axis displacement sinusoid function 510 and example plot 508 shows a X-axis displacement sinusoid function 510 and example plot 508 shows a Y-axis displacement sinusoid function 512. In the plot 506, the average scene point X-axis displacement for the sections is plotted on the vertical axis against the X-axis position of the respective sections on horizontal axis. Each point represents the average X-axis displacement of scene points in a section from the frame 504. Accordingly, the sinusoidal function 510 maps X-axis scene point displacements to X-axis positions. In the plot 508, the average scene point Y-axis displacement for the sections is plotted on the vertical axis against the X-axis position of the respective sections on the horizontal axis. Each point on the plot 508 represents the average Y-axis displacement of scene points in a section of the frame 504. Accordingly, the sinusoidal function 512 maps X-axis position to Y-axis scene point displacements.

The image processor may generate the sinusoid functions 510, 512 in any suitable manner. In some examples, the image processor may determine a discrete Fourier transform of the average scene point X-axis displacement versus X-axis position. The result of the discrete Fourier transform may be an indication of the frequency content of the scene point X-axis displacements including, for example, a magnitude of a constant (sometimes referred to as a DC offset) and a magnitude of a first spatial frequency term. The first spatial frequency term may correspond to a spatial frequency with a corresponding period equal to or about equal to the width of the frame 504. The image processor may be programmed to utilize the frequency content to populate the first few terms of a Fourier series describing the scene point X-axis displacements. An example Fourier series is given by Equation [2] below:

$$f(x) = \frac{1}{2}a_0 + \sum_{n=1}^{\infty} a_n \cos\left(\frac{2\pi x}{w}\right) + \sum_{n=1}^{\infty} b_n \sin\left(\frac{2\pi x}{w}\right) \quad [2]$$

In Equation [2], x is position on the X-axis and w is the width of the frame in pixel values. In some examples, the sinusoidal function may comprise the first constant, the first cosine function, and the first sine function of the Fourier series, for example, as given by Equation [3] below:

$$f(x) = \frac{1}{2}a_0 + a_1 \cos\frac{2\pi x}{w} + b_1 \sin\frac{2\pi x}{w} \quad [3]$$

In Equation [2], $a_0$ and $a_1$ are constants; f(x) may be the sinusoid 510, and x may be the X-axis position. In some examples, the constant or DC offset determined from the discrete Fourier transform may provide the term "½ $a_0$." The first spatial frequency term, referred to above, may be utilized to determine the values of "$a_1$" and "$b_1$". The sinusoidal function 510 may be found in a similar manner. Although displacement sinusoid models may be utilized for any type of frame, in some examples, displacement sinusoid models may be useful for frames captured by cameras with 360° fields-of-view. In such frames, including the example frames 4a, 4b, 4c, 4n of FIG. 1, scene point displacement may be continuous across the right and left edges of the frame making up the seam (e.g., seam 16 in FIG. 1). Because of this continuity, a smooth continuous function, such as a sinusoid, may fit the camera motion, as described herein. Also, in some examples, any suitable periodic function may be fit to the X-axis and Y-axis average displacements instead of a sinusoidal function.

At 412, the image processor may determine a distance between each scene point displacement and the scene point displacement predicted for the scene point based on its X-axis position. This may be referred to as a distance to the model. In some examples, the distance for each scene point includes an X-axis component and/or a Y-axis component. The X-axis component of the distance may be a distance between the X-axis displacement of the scene point and the X-axis displacement predicted for the X-axis position of the scene point by the X-axis displacement sinusoid function. The Y-axis component of the distance may be a distance between the Y-axis displacement of the scene point and the Y-axis displacement predicted for the X-axis position of the scene point by the Y-axis displacement sinusoid function.

Based on the distance determined at 412, the image processor may classify one or more of the scene points as foreground scene points at 414 considering the distance to the model for the scene points. In some examples, a scene point may be classified as a foreground scene point if its distance to the model is greater than a distance threshold. Any suitable distance threshold may be used. In some examples, the X-axis and Y-axis components of the distance to the model may be considered together. For example, a total distance may be found by taking the square root of the sum of the squares of the X-axis and Y-axis components of the distance to the model. In some examples, separate thresholds may be used for the X-axis and Y-axis components of the distance to the model. For example, a scene point may be classified as a foreground scene point if its X-axis component displacement exceeds an X-axis distance to the model threshold and its Y-axis component displacement exceeds a Y-axis distance to the model threshold. In some examples, a scene point may be classified as a foreground scene point if its X-axis component displacement exceeds an X-axis distance to the model threshold or its Y-axis component displacement exceeds a Y-axis distance to the model threshold.

At 416, the image processor may determine foreground regions of the frame 504 from the foreground scene points determined at 414. Foreground regions may be determined by extrapolating foreground scene points to surrounding pixel values. Any suitable extrapolation method may be used. In some examples, the image processor may mark pixel values in the frame 504 corresponding to foreground scene points indicating that they are in the foreground. The image processor may mark the frame 504 directly and/or may generate and mark a separate binary mask. For example, the binary mask may comprise asserted pixel values at positions on the X and Y axes corresponding to foreground and un-asserted pixel values at positions on the X and Y axes corresponding to background. The image processor may subsequently apply a filter to the frame 504 and/or mask to smooth edges between the foreground pixel values and non-foreground pixel values. Any suitable filter may be used such as, for example, a Gaussian or box filter.

Figure 12:
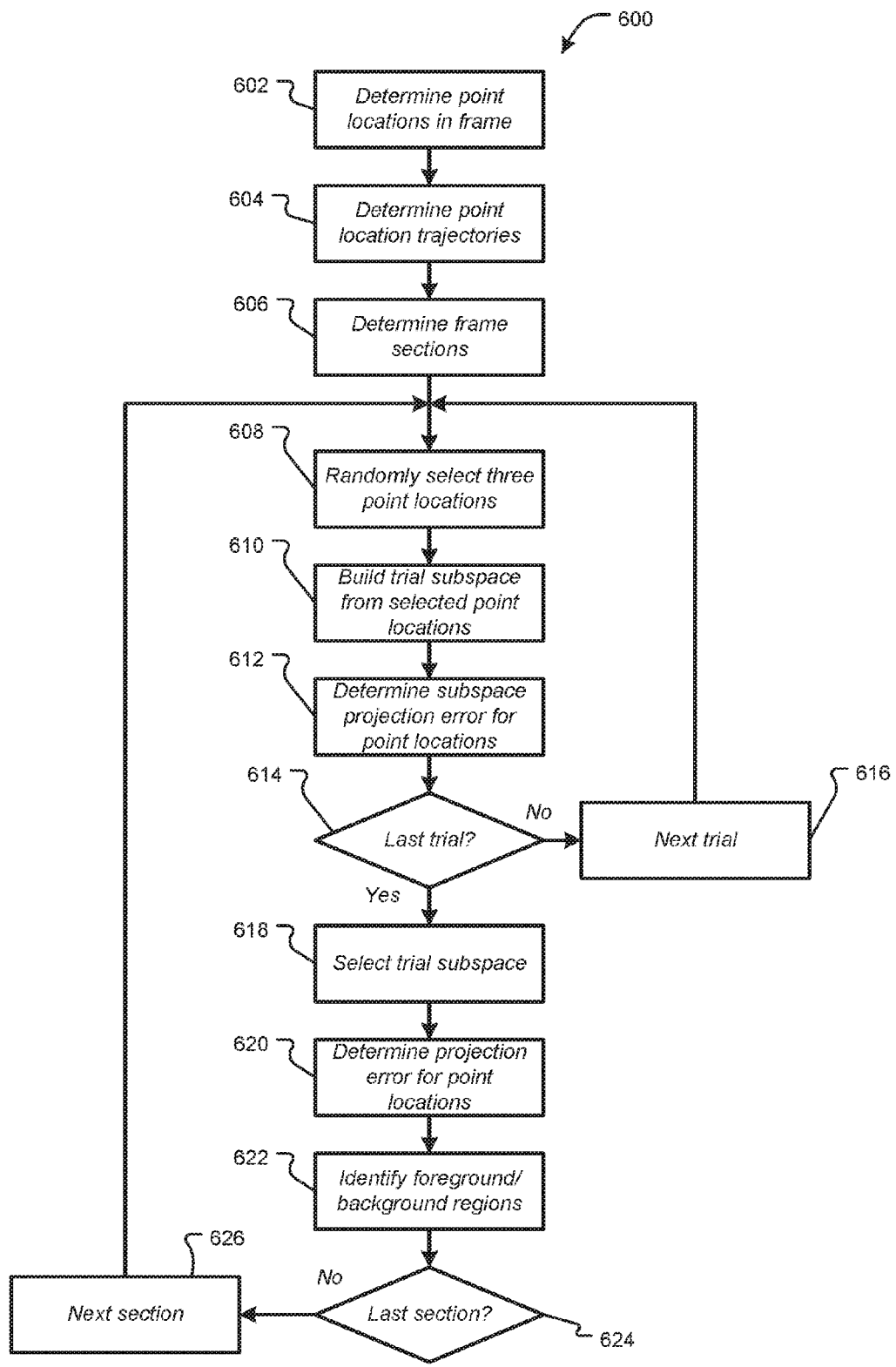
FIG. 12 is a flow chart showing one example of a process flow that may be executed by an image processor to identify foreground regions in a video frame utilizing a vector subspace model.

FIG. 12 is a flow chart showing one example of a process flow 600 that may be executed by an image processor to identify foreground regions in a subject video frame utilizing a vector subspace model. At 602, the image processor may determine scene point locations in the frame. Scene point locations in the frame may be determined, for example, as described herein (e.g., at 402). At 604, the image processor may determine scene point trajectories for scene points depicted at the scene point locations determined at 602. To find the trajectory for a scene point, the image processor may locate the scene point in a predetermined number of frames positioned before the subject video frame according to a video frame sequence. The set of X-axis and Y-axis coordinate pairs describing the positions of the scene point in the prior frames may be concatenated, as described herein, to form the trajectory vector.

At 606, the image processor may determine sections for the subject frame. Frame sections may be determined in any suitable manner. For example, frame sections may be columns, as shown in FIG. 1. In some examples, frame sections may include columns and rows, as shown in FIG. 8. In some examples, frame sections may overlap, as shown in FIG. 9. In some examples, frame sections may be sized such that orthographic assumptions hold or nearly hold within each individual section. At 608, the image processor may randomly select three scene point locations from a first section of the frame. The three scene point locations may be selected in any suitable manner. In some examples, the image processor may utilize a random or pseudo-random number generator or function to select the three scene points.

At 610, the image processor may build a trial vector subspace using as basis vectors the trajectories of the scene points depicted at the three randomly-selected scene point locations. In some examples, the image processor may determine if the three randomly selected scene point locations depict scene points with linearly-independent trajectories. If a set of three trajectories are not linearly-independent, it may not be possible to generate a trial subspace. Accordingly, the image processor may discard the linearly-dependent set of scene points and move on to a next randomly-selected set of scene point locations. At 612, the image processor may determine subspace projection errors for some or all of the scene points depicted by scene point locations in the subject frame section. As described herein, the projection error for a scene point describe a scalar distance between a scene point trajectory and its projection onto the trial vector subspace. At 614, the image processor may determine whether the current trial is the last trial. If not, the image processor, at 616, may move to a next trial. For the next trial, the image processor may randomly select a (usually different) set of three scene point locations from the subject frame section and generate another trial vector subspace at 608 and 610. Projection errors from scene point trajectories in the subject frame section to the new trial vector subspace may be found at 612.

When the last trial is complete at 614, the image processor may, at 618, select from the trial vector subspaces a vector subspace to be the camera motion model (e.g., vector subspace model). The image processor may select the trial vector subspace that most closely matches the scene point trajectories of scene points depicted at scene point locations in the subject frame section. For example, the image processor may select the trial vector subspace for which the highest number of scene point trajectories had a projection error less than a projection error threshold. Also, in some examples, the image processor may select the trial vector subspace with the lowest average projection error or the lowest sum of projection errors over scene points in the subject frame section.

When a vector subspace model is selected, the image processor, at 620, may optionally determine projection errors to the vector subspace model for all or a portion of the scene points depicted at scene point locations in the subject frame section. In some examples, projection errors for the scene points may have previously been determined when 612 was executed for the vector subspace model, in which case, 620 may be omitted. At 622, the image processor may identify foreground and/or background regions in the subject frame section. For example, scene points having a projection error to the vector subspace model less than a projection error threshold may be considered background scene points. Scene points having a projection error to the vector subspace model greater than the projection error threshold may be considered foreground scene points. The projection error threshold error used to classify a scene point as foreground or background may be the same projection error threshold described with respect to 618 above or a different projection error threshold. In some examples, the image processor may extrapolate background and/or foreground regions from the background and/or foreground scene points. This may be accomplished, for example, as described herein with respect to 416.

At 624, the image processor may determine whether any additional sections from the subject frame remain to be analyzed. If so, the image processor may increment to the next section at 626 and proceed back to 602. In some examples, when all sections of a subject frame are considered, the image processor may merge foreground and/or background regions across sections. For example, adjacent foreground and/or background regions may be joined.

In some examples, the image processor may utilize adaptive projection error thresholds that vary based on the magnitude (e.g., displacement) of scene point trajectories. In some examples, the projection error of a scene point trajectory to a subspace may depend on how closely the scene point trajectory fits the subspace and on the magnitude of or displacement of the trajectory. Using adaptive projection error thresholds may, at least partially, cancel out the dependence on displacement, providing a better indication of how closely a given scene point trajectory fits a subspace. Adaptive projection errors may be utilized to analyze trial vector subspaces and/or to compare scene point trajectories to a model vector subspace.

Figure 13:
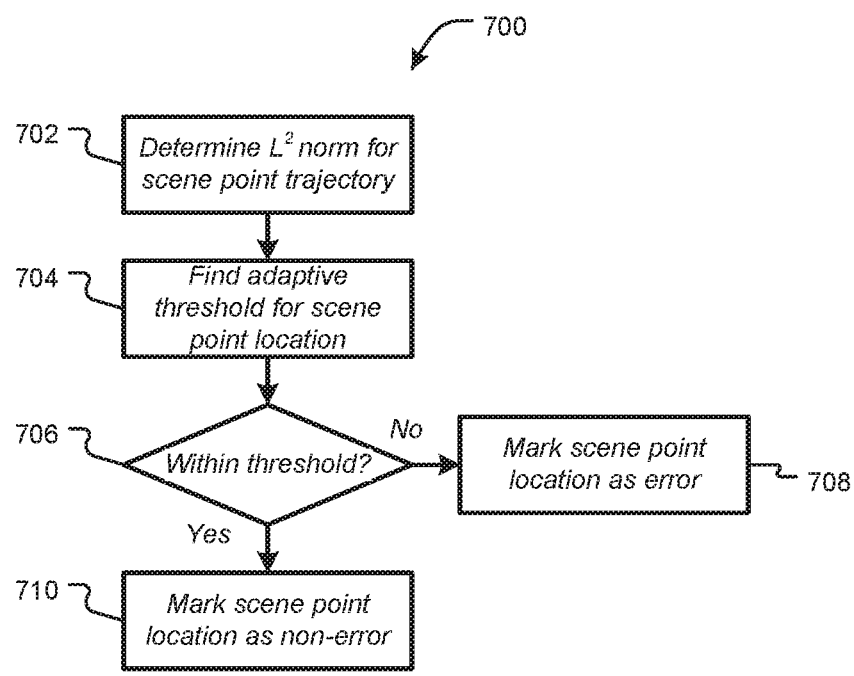
FIG. 13 is a flow chart showing one example of a process flow that may be executed by an image processor to compare a scene point trajectory to a vector subspace.

FIG. 13 is a flow chart showing one example of a process flow 700 that may be executed by an image processor to compare a scene point trajectory to a vector subspace. For example, the process flow 700 may be executed at 620 for each scene point in a subject frame section to compare the scene points to a vector model subspace. Also, in some examples, the process flow 700 may be executed at 612 for each scene point depicted by a scene point location in a subject frame section to compare the scene points to a trial vector subspace.

At 702, the image processor may determine an $L^2$ norm for the scene point. For example, the $L^2$ norm may represent the displacement of the scene point. For example, the $L^2$ norm may be found by taking the square root of the squares of the X-axis displacement of the scene point and the Y-axis displacement of the scene point, as indicated by Equation [4] below:

$$L^2 \sqrt{\text{norm}=(X\text{axisDisplacement})^2+(Y\text{axisDisplacement})^2} \quad [4]$$

At 704, the image processor may determine an adaptive threshold for the scene point considering the $L^2$ norm. This may be done in any suitable manner. In some examples, the image processor may be programmed with a function relating $L^2$ norm and projection error threshold. The image processor may apply the function using the $L^2$ norm found at 702 to determine the adaptive threshold. In some examples, the image processor may be programmed with a look-up table that list adaptive threshold values for ranges of $L^2$ norm. The image processor may determine the projection error threshold by selecting the look-up table entry corresponding to the $L^2$ norm determined at 702.

At 706, the image processor may determine whether projection error between the scene point trajectory and the considered subspace is less than the threshold determined at 704. If not, then the scene point may be marked as an error at 708. If yes, then the scene point may be marked as a non-error at 710. When the process flow 700 is executed in the context of selecting a model vector subspace, the error or non-error status of scene points may be used to evaluate trial subspaces, as described above. When the process flow 700 is executed in the context of analyzing scene point trajectories using a selected model vector subspace, the error or non-error status of scene points may be used to classify the scene points as foreground or background.

In some examples, the image processor may be programmed to correct for magnitude-dependence in a vector subspace model by matching the length of scene point trajectories to an error threshold. In some examples, the image processor may be programmed to select an error threshold. The image processor may then selectively modify the length of trajectory vectors to optimize the match between scene point trajectories and a vector subspace model. The image processor may modify a trajectory length by omitting from the trajectory X-axis and Y-axis values for a scene point location from one or more frame. For example, the omitted frame or frames may be furthest from the subject frame according to the video sequence. Also, in some examples, the image processor may use scene point trajectories of a selected length (e.g., 15 frames) and identify a threshold that optimized the match between scene point trajectories and the vector subspace model. Modifying the length of trajectory vectors and/or selecting a best-fit threshold, as described herein, may be used when evaluating trial vector subspaces and/or when comparing a scene point to a selected model vector subspace.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of detecting foreground regions in a panoramic video, the method comprising:
   receiving, by a computing device, panoramic video data comprising a plurality of panoramic frames and video frame sequence data indicating a video frame sequence for the plurality of panoramic frames, wherein a first panoramic frame of the plurality of panoramic frames comprises a first plurality of pixel values and first spatial data describing a spatial arrangement of the first plurality of pixel values on a two-dimensional grid described by an X-axis and a Y-axis;
   selecting, by the computing device and from the first panoramic frame, a plurality of scene point locations positioned on the two-dimensional grid, wherein a first scene point location of the plurality of scene point locations depicts a first scene point from a scene shown by the panoramic video depicted by the panoramic video data, and wherein the first scene point location is at a first position on the two-dimensional grid corresponding to a location of a first pixel value of the first plurality of pixel values;
   identifying, by the computing device, a first prior location depicting the first scene point at a second panoramic frame before the first panoramic frame in the video frame sequence;
   identifying, by the computing device, a second prior location depicting the first scene point at a third panoramic frame before the second panoramic frame in the panoramic video;
   determining, by the computing device, a first trajectory for the first scene point, wherein the first trajectory is a vector comprising a concatenation of a first coordinate set for the first scene point location, a second coordinate set for the first prior location and a third coordinate set for the second prior location;
   determining, by the computing device a plurality of columns from the first panoramic frame, wherein the first scene point location is in a first column of the plurality of columns;
   randomly selecting, by the computing device, a second scene point location in the first column, a third scene point location in the first column, and a fourth scene point location in the first column;
   generating, by the computing device, a first vector subspace, wherein a second trajectory of a second scene point depicted at the second scene point location, a third trajectory of a third scene point depicted at the third scene point location, and a fourth trajectory of a fourth scene point depicted at the fourth scene point are basis vectors of the first vector subspace;
   determining, by the computing device, a first projection error for the first scene point to the first vector subspace;
   determining, by the computing device, that the first projection error is greater than a projection error threshold; and
   writing, by the computing device, an indication of the first pixel value to a listing of foreground pixel values.

2. The method of claim 1, further comprising generating, by the computing device, a predetermined number of vector subspaces from scene point trajectories of scene points depicted at scene point locations in the first column, wherein the predetermined number of vector subspaces comprises the first vector subspace, and wherein the first vector subspace has the lowest number of scene point locations depicting scene points with scene point trajectories having projection errors less than the projection error threshold.

3. The method of claim 1, further comprising:
   determining, by the computing device, a displacement of the first scene point; and determining, by the computing device, the projection error threshold based at least in part on the displacement of for the first scene point.

4. A computer-implemented system for detecting foreground in a video frame, comprising: at least one processor; and a non-transitory computer readable data storage device comprising instructions stored thereon that, when executed by the at least one processor, cause the at least one processor to: receive video data comprising a plurality of frames and a video frame sequence for the plurality of frames, wherein a first frame of the plurality of frames comprises a first plurality of pixel values and first spatial data describing a spatial arrangement of the first plurality of pixel values in a two-dimensional coordinate system; select, from the first frame, a plurality of scene point locations in the two-dimensional coordinate system, wherein a first scene point is depicted at a first scene point location of the plurality of scene point locations; identify a prior scene point location depicting the first scene point at a prior frame that is before the first frame in the video frame sequence; determine a first trajectory for the first scene point based at least in part on the first scene point location and the prior scene point location; determine a plurality of sections from the first frame, wherein a set of scene point locations is in a first section of the plurality of sections, and wherein the set of scene point locations includes the first scene point location; generate a first vector subspace, wherein a second trajectory of a second scene point, a third trajectory of a third scene point, and a fourth trajectory of a fourth scene point are basis vectors of the first vector subspace, and wherein the second scene point, the third scene point, and the fourth scene point are depicted in the first section; determine a projection error for the first scene point to the first vector subspace; determine that the projection error is greater than a projection error threshold; and write an indication of a first pixel value corresponding to the first scene point location to a listing of foreground pixel values.

5. The system of claim 4, wherein the data storage device further comprises instructions stored thereon that, when executed by the at least one processor, cause the at least one processor to:
 determine a displacement for the first scene point; and
 determine the projection error threshold based at least in part on the displacement for the first scene point.

6. The system of claim 4, wherein the data storage device further comprises instructions stored thereon that, when executed by the at least one processor, cause the at least one processor to:
 generate a plurality of trial vector subspaces; and
 select the first vector subspace from the plurality of trial vector subspaces based at least in part on a number of scene points depicted at scene point locations selected from the set of scene point locations in the first section that have scene point trajectories with projection errors to the first vector subspace below the projection error threshold.

7. The system of claim 4, wherein the data storage device further comprises instructions stored thereon that, when executed by the at least one processor, cause the at least one processor to:
 randomly select from the set of scene point locations in the first section, a second scene point location depicting the second scene point, a third scene point location depicting the third scene point, and a fourth scene point location depicting the fourth scene point;
 randomly select from the set of scene point locations in the first section, a fifth scene point location depicting a fifth scene point, a sixth scene point location depicting a sixth scene point, and a seventh scene point location depicting a seventh scene point;
 generate a second vector subspace, wherein a fifth trajectory of the fifth scene point, a sixth trajectory of the sixth scene point, and a seventh trajectory of the seventh scene point are basis vectors of the second vector subspace;
 determine a first number of projection errors for scene points depicted by scene point locations of the set of scene point locations in the first section to the first vector subspace that exceed the projection error threshold;
 determine a second number of projection errors for scene points depicted by scene point locations of the set of scene point locations in the first section to the second vector subspace that exceed the projection error threshold; and
 determine that the second number is larger than the first number.

8. The system of claim 4, wherein the data storage device further comprises instructions stored thereon that, when executed by the at least one processor, cause the at least one processor to:
 generate a second vector subspace, wherein a fifth trajectory of a fifth scene point, a sixth trajectory of a sixth scene point, and a seventh trajectory of a seventh scene point are basis vectors of the second vector subspace, wherein the fifth scene point is depicted at a fifth scene point location in a second section of the plurality of sections, wherein the sixth scene point is depicted at a sixth scene point location in the second section, and wherein the seventh scene point is depicted at a seventh scene point location in the second section;
 determine a projection error for an eighth scene point to the second vector subspace, wherein the eighth scene point is depicted at an eighth scene point location in the second section;
 determine that the projection error for the eighth scene point is greater than the projection error threshold; and
 write an indication of a second pixel value at a location corresponding to the eighth scene point location to the listing of foreground pixel values.

9. The system of claim 4, wherein the first scene point location is also in a second section of the plurality of sections that is adjacent to the first section, and wherein the data storage device further comprises instructions stored thereon that, when executed by the at least one processor, cause the at least one processor to:
 generate a second vector subspace for the second section;
 determine a second projection error for the first scene point to the second vector subspace; and
 determine that the second projection error is greater than the projection error threshold.

10. The system of claim 4, wherein the plurality of scene point locations are uniformly spaced on the first frame.

11. The system of claim 4, wherein the data storage device further comprises instructions stored thereon that, when executed by the at least one processor, cause the at least one processor to determine a first region selected from the first frame that depicts an object, wherein a density of the plurality of scene point locations is higher at the first region than at a second region of the first frame.

12. The system of claim 4, wherein the data storage device further comprises instructions stored thereon that, when executed by the at least one processor, cause the at least one processor to:

determine that a texture level at a first region of the first frame is less than a texture threshold; and omit scene point locations of the plurality of scene point locations from the first region of the first frame.

13. The system of claim 4, wherein the data storage device further comprises instructions stored thereon that, when executed by the at least one processor, cause the at least one processor to:

identify a plurality of scene point locations, including the first scene point location, that depict scene points with a projection error to the first vector subspace less than the projection error threshold; and generate a foreground region of the first frame, wherein the foreground region comprises the plurality of scene point locations.

14. The system of claim 13, wherein the data storage device further comprises instructions stored thereon that, when executed by the at least one processor, cause the at least one processor to generate a binary mask comprising a plurality of binary mask pixel values, wherein a first binary mask pixel value corresponding to the first scene point location is asserted and a second binary mask pixel value not corresponding to any of the plurality of scene point locations is un-asserted.

15. A computer-implemented method for detecting foreground in a video frame, comprising: receiving, by a computing device, video data comprising a plurality of frames and a video frame sequence for the plurality of frames, wherein a first frame of the plurality of frames comprises a first plurality of pixel values and first spatial data describing a spatial arrangement of the first plurality of pixel values in a two-dimensional coordinate system; selecting, by the computing device and from the first frame, a plurality of scene point locations in the two-dimensional coordinate system, wherein a first scene point is depicted at a first scene point location of the plurality of scene point locations; identifying, by the computing device, a prior scene point location depicting the first scene point at a prior frame that is before the first frame in the video frame sequence; determining, by the computing device, a first trajectory for the first scene point based at least in part on the first scene point location and the prior scene point location; determining, by the computing device, a plurality of sections from the first frame, wherein a set of scene point locations are in a first section of the plurality of sections, and wherein the set of scene point locations includes the first scene point location; generating, by the computing device, a first vector subspace, wherein a second trajectory of a second scene point, a third trajectory of a third scene point, and a fourth trajectory of a fourth scene point are basis vectors of the first vector subspace, and wherein the second scene point, the third scene point, and the fourth scene point are depicted in the first section; determining, by the computing device, a projection error for the first scene point to the first vector subspace; determining, by the computing device, that the projection error is greater than a projection error threshold; and writing, by the computing device, an indication of a first pixel value corresponding to the first scene point location to a listing of foreground pixel values.

16. The method of claim 15, further comprising:

generating, by the computing device, a plurality of trial vector subspaces; and selecting, by the computing device, the first vector subspace from the plurality of trial vector subspaces based at least in part on a number of scene points depicted at scene point locations selected from the set of scene point locations in the first section that have scene point trajectories with projection errors to the first vector subspace below the projection error threshold.

17. The method of claim 15, wherein the first scene point location is also in a second section of the plurality of sections that is adjacent to the first section, further comprising:

generating, by the computing device, a second vector subspace for the second section;

determining, by the computing device, a second projection error for the first scene point to the second vector subspace; and determining, by the computing device, that the second projection error is greater than the projection error threshold.

18. The method of claim 15, further comprising:

determining, by the computing device, a displacement for the first scene point; and determining, by the computing device, the projection error threshold based at least in part on the displacement for the first scene point.

19. The method of claim 15, further comprising generating, by the computing device, a second vector subspace, wherein a fifth trajectory of a fifth scene point, a sixth trajectory of a sixth scene point, and a seventh trajectory of a seventh scene point are basis vectors of the second vector subspace, wherein the fifth scene point is depicted at a fifth scene point location in a second section of the plurality of sections, wherein the sixth scene point is depicted at a sixth scene point location in the second section, and wherein the seventh scene point is depicted at a seventh scene point location in the second section;

determining, by the computing device, a projection error for an eighth scene point to the second vector subspace, wherein the eighth scene point is depicted at an eighth scene point location in the second section;

determining, by the computing device, that the projection error for the eighth scene point is greater than the projection error threshold; and writing, by the computing device, an indication of a second pixel value at a location on the two-dimensional coordinate system corresponding to the eighth scene point location to the listing of foreground pixel values.

20. The method of claim 15, wherein the plurality of scene point locations are uniformly spaced on the first frame.

* * * * *